United States Patent [19]

Okubo et al.

[11] Patent Number: 4,919,045
[45] Date of Patent: Apr. 24, 1990

[54] OFFSET PRINTER HAVING A PRESS DRUM LARGER THAN ITS RUBBER DRUM

[75] Inventors: Toshimitsu Okubo, Shibata; Kazuyoshi Kobayashi, Murata; Kohki Ohmura, Shibata; Yoshinobu Sai, Watari; Takuo Satoh; Yukihiko Yoshino, both of Shibata; Nobuyuki Hoshi, Sendai; Takayuki Onodera, Shibata; Yasuo Endoh, Shiroishi; Sigenobu Irokawa, Sendai; Toshiaki Sannohe, Watari, all of Japan

[73] Assignee: Ricoh Company, Ltd., Tokyo, Japan

[21] Appl. No.: 257,941

[22] Filed: Oct. 14, 1988

[30] Foreign Application Priority Data

Oct. 14, 1987 [JP] Japan .................. 62-156027

[51] Int. Cl.⁵ .................. B41F 7/06; B41C 1/10
[52] U.S. Cl. .................. 101/142; 101/467
[58] Field of Search ............ 101/142, 136, 137, 116, 101/118, 128.4, 132, 132.5, 467, 128.21

[56] References Cited

U.S. PATENT DOCUMENTS

| | | | |
|---|---|---|---|
| 1,085,224 | 1/1914 | Roesen | 101/137 |
| 1,635,299 | 7/1927 | Wohlrabe | 101/137 |
| 2,593,180 | 4/1952 | Pritchard | 101/142 |
| 3,698,312 | 10/1972 | Muller | 101/142 |
| 3,745,235 | 7/1973 | Bestenreiner et al. | 101/467 X |
| 3,750,573 | 8/1973 | Haeusler et al. | 101/142 X |
| 4,134,341 | 1/1979 | Weigele et al. | 101/142 |
| 4,208,233 | 6/1980 | Iwanaga | 101/132.5 X |
| 4,628,813 | 12/1986 | Hasegawa et al. | 101/128.4 X |

FOREIGN PATENT DOCUMENTS

| | | | |
|---|---|---|---|
| 2846968 | 5/1979 | Fed. Rep. of Germany | 101/142 |
| 73988 | 4/1987 | Japan | 101/128.4 |
| 2194920 | 3/1988 | United Kingdom | 101/128.4 |

Primary Examiner—Clifford D. Crowder
Attorney, Agent, or Firm—Oblon, Spivak, McClelland, Maier & Neustadt

[57] ABSTRACT

An offset printer having a printing section and a plate making section in a unitary assembly. The plate making section is located above the printing section. The printing section includes a plate drum, a rubber drum, and a press drum. The press drum is disposed above and at a predetermined angle relative to the rubber drum. The diameter of the press drum is at least two times as great as the diameter of the rubber drum.

11 Claims, 3 Drawing Sheets

OFFSET PRINTER HAVING A PRESS DRUM LARGER THAN ITS RUBBER DRUM

FIELD OF THE INVENTION

The present invention relates to an offset printer having a plate making section and a printing section and, more particularly, to an offset printer of the type having a unitary plate making and printing assembly with a miniature plate making section disposed above a printing section and performing digital image processing in the plate making section.

BACKGROUND OF THE INVENTION

An offset printer including a plate making section which is implemented by an electrophotographic procedure and an offset printing section is known in the art. With such a printer, it has been customary to arrange the plate making section and the printing section side by side by considering the fact that charging, exposing, developing and fixing processes involved in electrophotographic printing are apt to increase the overall dimensions of the printer and the fact that toner, or developer, is apt to be scattered around. Hence, a substantial space has to be allocated to the plate making section and, moreover, a plate produced by the plate making section has to be loaded in the printer by hand. The electrophotographic procedure processes an image by analog signal processing and therefore is not suitable for use as an output terminal of a computer or similar digital apparatus.

Generally, the printing section of the above-described type of offset printer is made up of a plate drum for wrapping a plate therearound, a rubber drum to which an image is to be transferred from the plate, and a press drum for clamping and transporting a paper to which the image is to be transferred from the rubber roller. The rubber roller is disposed obliquely below the plate drum, and the press drum is disposed obliquely below the rubber drum. An image is transferred from the rubber drum to the paper in a nipping section which is defined between the press drum and the rubber drum. Immediately after the press roller unclamps the paper, the paper with the image is driven out of the printer by way of a discharge pawl and a discharge roller. A problem with such a prior art offset printer is that when the paper has a substantial length, the trailing edge of the paper remains nipped in the nipping section by the press and rubber drums when the leading edge of the paper is released from the press drum. In such a condition, the leading edge of the paper is apt to spring back toward and adhere to the rubber drum due to ink which is deposited on the rubber drum, jamming the paper transport path of the printer. While various attempts have heretofore been made to eliminate such an occurrence, each of them has both merits and demerits.

OBJECTS OF THE INVENTION

It is therefore an object of the present invention to provide an offset printer in which a miniature plate making section is disposed above and arranged integrally with a printing section.

It is another object of the present invention to provide an offset printer including a plate making section which performs digital image processing.

It is another object of the present invention to provide an offset printer which eliminates jams which are ascribable to the spring-back of paper.

It is another object of the present invention to provide a generally improved offset printer.

SUMMARY OF THE INVENTION

An offset printer for recording an image of an original document on a sheet material to make a plate and then printing the image on a paper of the present invention comprises in combination a plate making section for reading the image of the document, performing predetermined image processing, and forming an image resulting from the image processing on the sheet material to produce the plate, and a printing section disposed below the plate making section for printing the image formed on the plate on a paper when the plate is fed to the printing section.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
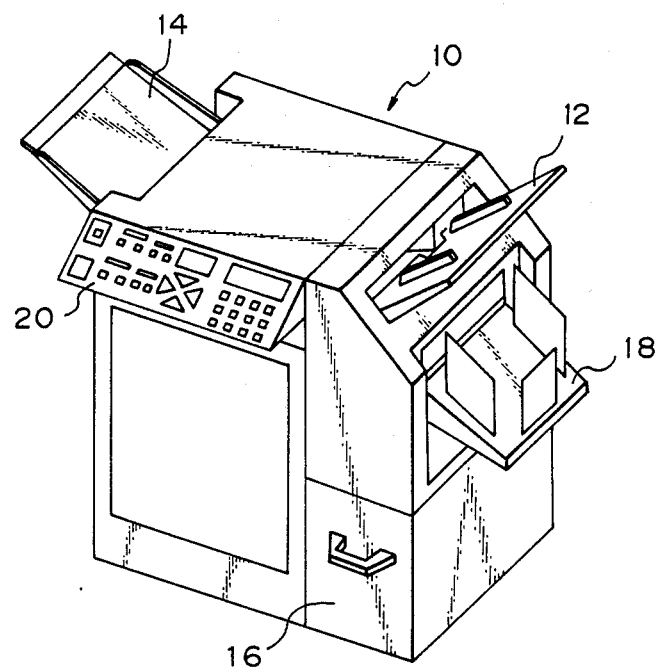
FIG. 1 is a perspective view showing an offset printer embodying the present invention.
Figure 2:
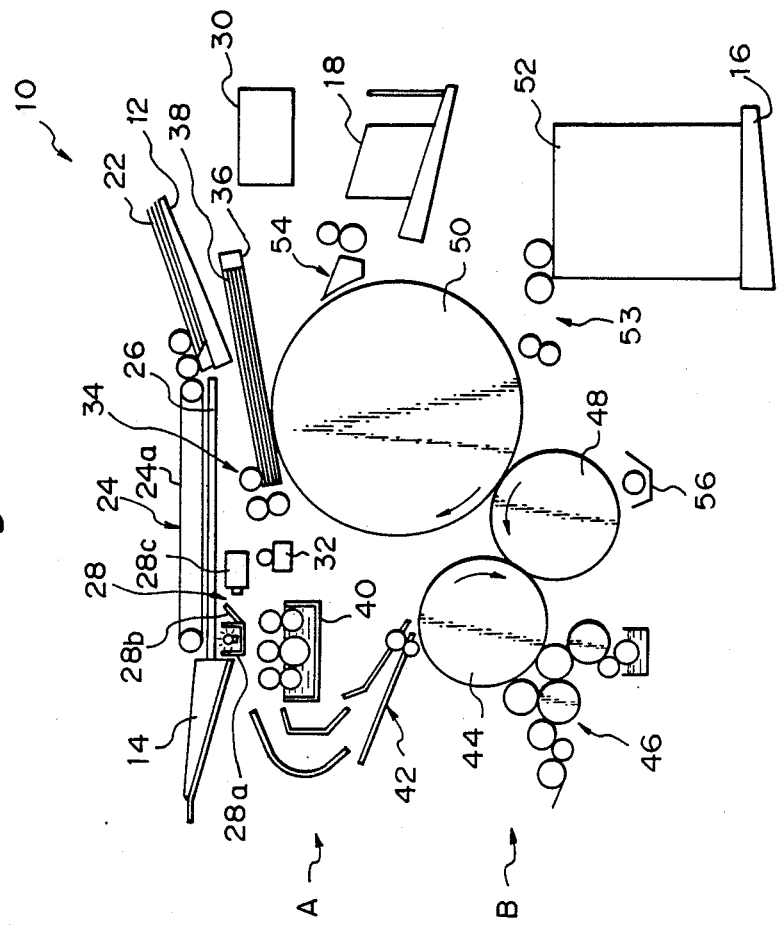
FIG. 2 is a schematic section of the printer shown in FIG. 1.

Referring to FIGS. 1 and 2 of the drawings, an offset printer in accordance with the present invention is shown and generally designated by the reference numeral 10. In the figure, the printer 10 is generally comprised of a plate making section A and a printing section B which is disposed below the plate making section A. More specifically, the plate making section A and the printing section B are positioned one above the other and constructed into an integral assembly. Shown in FIG. 1 are a document feed tray 12 and a document discharge tray 14 which are included in the plate making section A, a paper feeder 16 and a paper discharge tray 18 which are included in the printing section B, and an operation board 20.

In the plate making section A, a document 22 laid on the document feed tray 12 is fed to a glass platen 26 by an automatic document feeder 24 which includes a transport belt 24a. After the document 22 has been scanned by a scanner 28, it is driven out of the printer 10 to the document discharge 14. The scanner 28 is adapted to scan the document 22 and includes a light source 28a, a mirror 28b, and a CCD (Charge Coupled Device) array or similar light receiving assembly, or image reader, 28C. An image signal outputted by the image reader 28c in the form of a digital signal is processed electrically by an image processing unit 30 and then applied to a writing unit 32 which includes heating elements. It is to be noted that the image processing unit 32 and the writing unit 32 may be implemented by those which are well known in the art. A thermosensitive sheet 38 for forming a plate is fed from a tray 36 to the writing unit 32 by a plate feeding device 34. The thermosensitive sheet 38 on which a predetermined image has been recorded by the writing unit 32, or plate, is advanced to an etching unit 40. The etching unit 40 makes image portions and non-image portions of the thermosensitive sheet 38 affinitive to oil and water, respectively, thereby producing a plate 38. The plate 38 coming out of the etching unit 40 is fed from the plate making section A to the printing section B by a plate transport arrangement 42. In the printing section B, the plate 38 is wrapped around a plate drum 44.

Figure 4:
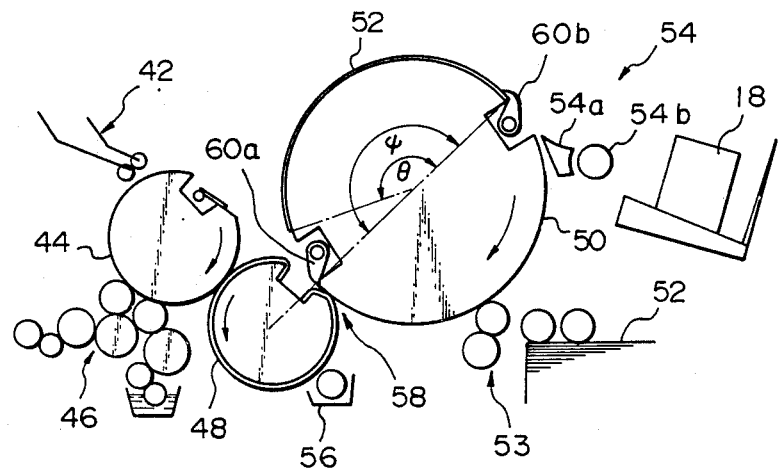
FIG. 4 schematically shows a specific construction of a printing section which is included in the printer of FIGS. 1 and 2.

The printing section B includes an inking device 46 for supplying ink and water to the plate 38 while it is wrapped around the plate drum 44 as stated above. The ink deposited on the plate 38 is transferred to a rubber drum 48. The paper feeder 16 is disposed at the right-hand side and below a press drum 50 as viewed in FIG. 2. Rollers 53 drive a paper 52 from the paper feeder 16 to the press drum 50. Clamping pawls or clampers 60a and 60b, FIG. 4, are provided on the press drum 50 to selectively clamp the leading edge of the paper 52. As the press drum 50 is rotated as indicated by an arrow in FIG. 2 with the paper 52 being retained by the clamper 60a or 60b, the ink is transferred from the rubber drum 48 to the paper 52. The paper 52 is released from the clamper 60a or 60b immediately before it reaches a paper discharging mechanism 54 and then stacked on the paper discharge tray 18 by the paper discharge mechanism 54. The reference numeral 56 designates a cleaning unit for cleaning the rubber drum 48.

As stated above, the offset printer 10 records an image on the thermosensitive sheet 38 by the writing unit 32 and then etches the thermosensitive sheet 38 by the etching unit 40 to produce a plate.

When the miniaturized plate making section A is disposed above the printing section B and the plate produced by the plate making section A is automatically wrapped around the plate drum 44 of the printing section B as discussed above, the entire sequence from plate making to printing can be automated.

Figure 3:
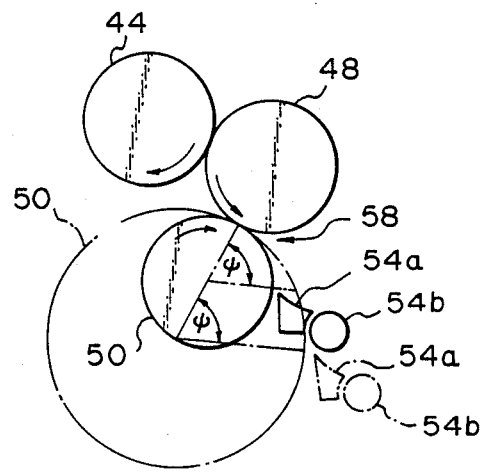
FIG. 3 schematically shows a printing section of a prior art offset printer.

Before entering into the description of a specific construction of the printing section B, the printing section of a prior art offset printer will be outlined with reference to FIG. 3. As shown, the printing section of the prior art offset printer, like the printing section B shown and described, includes a plate drum 44 for wrapping a plate therearound, a rubber drum 48 to which an image is to be transferred from the plate, and a press drum 50 for clamping and transporting a paper to which an image is to be transferred from the rubber drum 48. The prior art printing section differs from the printing section B of the present invention in that the rubber drum 48 is located obliquely below the plate drum 44, and the press drum 50 is located obliquely below the rubber drum 48. While a paper is retained by the press drum 50, an image is transferred from the rubber drum 48 to the paper at a nipping section 58 between the press drum 50 and the roller drum 48. Immediately after the paper is released from the press drum 50, it is driven out of the printer by way of a discharge pawl 54a and discharge rollers 54b. In this kind of printing section, the angular distance $\phi$ available between the nipping section 58 and the paper discharge and which defines the circumferential length of the press drum 50 is as small as 60 degrees to 90 degrees. This brings about a problem that, if the paper has a substantial length, its trailing edge is still nipped in the nipping section 58 between the press drum 50 and the rubber drum 48 when its leading end is released at a position immediately before the discharge pawl 54a and, hence, the paper springs back toward and adheres to the rubber drum 48 to cause a jam.

An implementation heretofore adopted against a jam of the above-described kind is a roller which presses a paper against the press drum 50 or an exclusive discharge drum or a chain delivery mechanism which pulls the leading edge of a paper. A drawback with the roller scheme is that a change in the width of a paper cannot be accommodated without the need for troublesome adjustment and, in addition, a large image area is unavailable. The exclusive discharge drum scheme is disadvantageous in that the paper discharge position becomes too low to facilitate the removal of printings and the overall height of the printer is increased. Further, the chain delivery scheme needs a substantial space in the direction of paper discharge which eventually adds to the longitudinal dimension of the printer. Moreover such a mechanism is complicated in construction.

Another possible implementation may be doubling the diameter of the press drum 50 as indicated by a phantom line in FIG. 3 and thereby increasing the circumferential length of the drum 50 between the nipping section 58 and the sheet discharge position. In the figure, the resulting positions of the discharge pawl 54a and the discharge roller 54b relative to the drum 50 are also indicated by phantom lines. Such an alternative approach, however, not only increases the height of the entire printer but also fails to noticeably increase the circumferential length of the press drum 50 as defined by the angle $\phi$ of 60 degrees to 90 degrees. Increasing the angle $\phi$ to 180 degrees to 210 degrees and thereby the circumferential length of the press drum 50 between the nipping section 58 and the paper discharge position would lower the paper discharge position, making it difficult to remove printings. Also, such a circumferential length of the press drum 50 would cause the discharge pawl 54a to tend to return a paper and therefore result in the need for a discharge pawl 54a and a discharge roller 54b which are bulky.

The printing section B of the offset printer 10 in accordance with the present invention is so constructed and arranged as to eliminate the drawbacks particular to the prior art as discussed above.

Referring to FIG. 4, a specific construction of the printing section B is shown. The rubber drum 48 and plate drum 44 shown in the figure are essentially the same as those of the prior art with respect to arrangement and dimensions. In the printing section B, the press drum 50 is located obliquely above and at a predetermined angle relative to the rubber drum 48. The press drum 50 is provided with a diameter which is double the diameter of the rubber drum 48. The discharge pawl 54a of the paper discharging mechanism 54 is spaced apart from the nipping section 58 of the press drum 50 and the rubber drum 48 by an angular distance of more than 180 degrees in the direction of rotation of the press drum 50. A pair of paper clamping pawls or clampers 60a and 60b are provided on the press drum 50 at diametrically opposite positions to each other.

In operation, as the rollers 53 feed a paper 52 toward the press drum 50, the clamper 60a or 60b clamps the leading edge of the paper 52 so that the paper 52 is retained on the press drum 50. A plate is wrapped around the plate drum 44 by the plate transport arrangement 42 and supplied with ink and water by the inking device 46. Ink on the plate is transferred to the rubber drum 48 and then from the rubber drum 48 to the paper 52 which is transported by the press drum 50, whereby an image is formed on the paper 52. The paper 52 is released from the clamper 60a or 60b by the operation of a cam, not shown, immediately before it reaches the discharge pawl 54a and is then stacked on the paper discharge tray 18 by the discharge rollers 54b. In the specific arrangement shown in FIG. 4, an image may be printed out on two papers for each rotation of the press drum 50 because the diameter of the press drum 50 is two times greater than that of the rubber drum 48.

FIG. 4 shows an instantaneous condition wherein the clamper 60b is about to release the printed paper 52. At this instant, the trailing edge of the paper 52 is already moved away from the nipping section 58 between the press drum 50 and the rubber drum 48, and the paper 52 is simply retained at its leading edge by the clamper 60b. The paper 52 is therefore prevented from wrapping around the rubber drum 48 despite the ink which is deposited on the surface of the rubber drum 48. More specifically, when the paper 52 has the greatest allowable length, an arc which the paper 52 forms has an angle $\theta$ lying in the range of substantially 150 degrees to 180 degrees. However, since the diameter of the press drum 50 is double the diameter of the rubber drum 48, the angle $\theta$ between the paper discharge position of the press drum 50 and the nipping section 58 may be selected to be as great as 180 degrees, to 210 degrees, which is greater than the angle $\theta$. Hence, the leading edge of the paper 52 will have moved away from the nipping section 58 at the instant when the leading edge of the same is released from the clamper 60b.

It is to be noted that the diameter of the press drum 50 shown and described is only illustrative and may be even more than two times (integral multiple) greater than the diameter of the rubber drum 48.

In summary, various advantages are attainable with the present invention as enumerated below.

(1) A plate making section is miniaturized and disposed above a printing section, reducing the overall dimensions of a printer.

(2) The printer is applicable as an output terminal of a computer or similar digital apparatus because the plate making section performs digital image processing.

(3) Jams ascribable to paper which may spring back to adhere to the rubber drum are eliminated.

(4) Ink, water and cleaning liquid can be positioned at relatively low levels to eliminate troubles due to dripping of liquids.

Various modifications will become possible for those skilled in the art after receiving the teachings of the present disclosure without departing from the scope thereof.

What is claimed is:

1. An offset printer comprising:
   (a) a plate making section for reading the image of documents, performing predetermined image processing, and forming images resulting from the image processing on sheet material to produce plates;
   (b) a plate drum disposed beneath said plate making section;
   (c) first means for feeding plates from said plate making section to said plate drum and for wrapping the plates around said plate drum;
   (d) second means for supplying ink and water to the plates while they are wrapped around said plate drum;
   (e) a rubber drum disposed obliquely below and in operative association with said plate drum, said rubber drum having a first diameter;
   (f) a press drum:
      (i) disposed obliquely above and at a predetermined angle relative to said rubber drum;
      (ii) in operative association with said rubber drum at a nipping section;
      (iii) disposed between said rubber drum and said plate making section; and
      (iv) having a second diameter that is an integral multiple equal to or greater than two of said first diameter;
   (g) third means for feeding sheets of paper to said nipping section of said press drum; and
   (h) fourth means on said press drum for gripping sheets of paper at the nipping section, wrapping them around said press drum, and releasing them at a position located far enough away from said nipping section around the periphery of said press drum such that the trailing edge of each sheet of paper wrapped around said press drum has passed said nipping section before the leading edge is released by the fourth means from the press drum.

2. An offset printer as claimed in claim 1, in which said second means is disposed below the plate drum.

3. An offset printer as claimed in claim 1, in which said third means is disposed below the press drum.

4. An offset printer as claimed in claim 1, further comprising sheet discharging means for discharging the sheets of paper to a sheet discharge tray.

5. An offset printer as claimed in claim 4, in which said sheet discharge means is disposed above said third means.

6. An offset printer as claimed in claim 1, in which said plate making section comprises reading means for optically reading the image of document to convert the image into an electrical signal, image processing means for transforming the electrical signal into a digital image signal, and writing means for thermally writing the digital image signal on the plate.

7. An offset printer as claimed in claim 6, in which said reading means comprises an optical system for scanning the image of the documents and an image reader having a CCD for converting the image into the electrical signal.

8. An offset printer as claimed in claim 6, in which said plate making section further comprises automatic document transporting means for automatically transporting the documents.

9. An offset printer as claimed in claim 6, in which said plate making section further comprises etching means for etching the plate on which the image is formed.

10. An offset printer as claimed in claim 1, in which an angular distance between a paper discharge position of said press drum and said nipping section of said press drum and said rubber drum lies in a range of substantially 180 degrees to 210 degrees.

11. An offset printer as claimed in claim 10, in which the image is printed on two sheets of paper for one rotation of said press drum.

* * * * *